Oct. 16, 1956          C. VAN DER LELY          2,766,576
DEVICE FOR PICKING UP CUT CROP OR OTHER
MATERIAL LYING ON THE GROUND
Filed Nov. 26, 1952                                 2 Sheets-Sheet 1
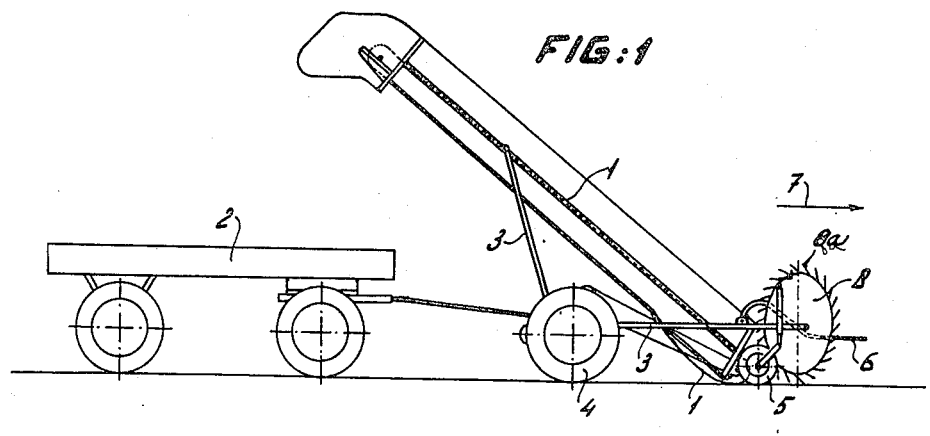
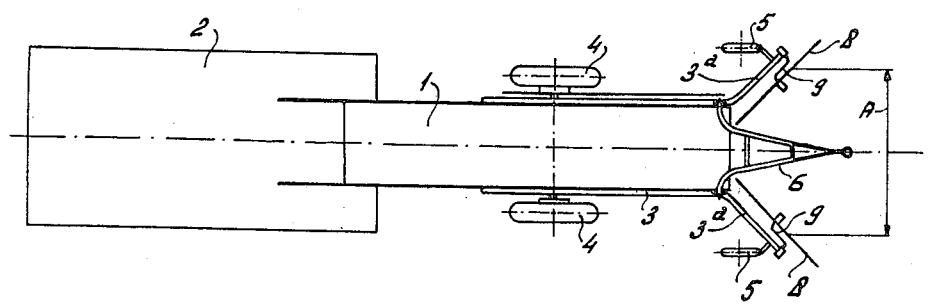
INVENTOR.
CORNELIS VAN DER LELY
BY
Heseltine, Lake + Co.
AGENTS Oct. 16, 1956 C. VAN DER LELY 2,766,576
DEVICE FOR PICKING UP CUT CROP OR OTHER
MATERIAL LYING ON THE GROUND
Filed Nov. 26, 1952 2 Sheets-Sheet 2
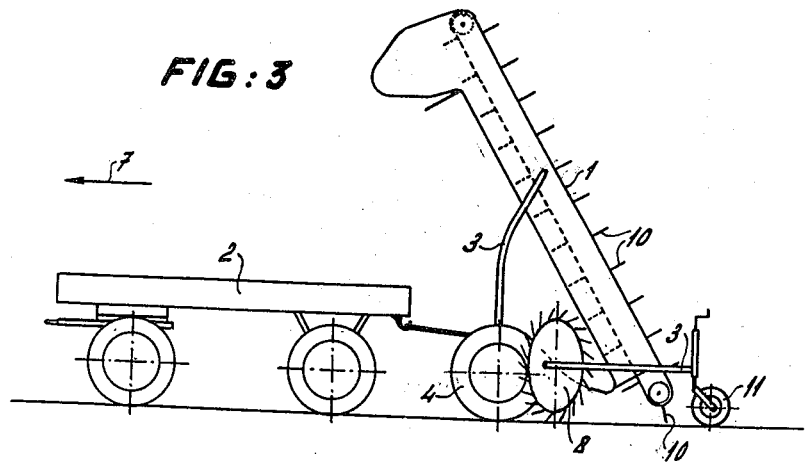
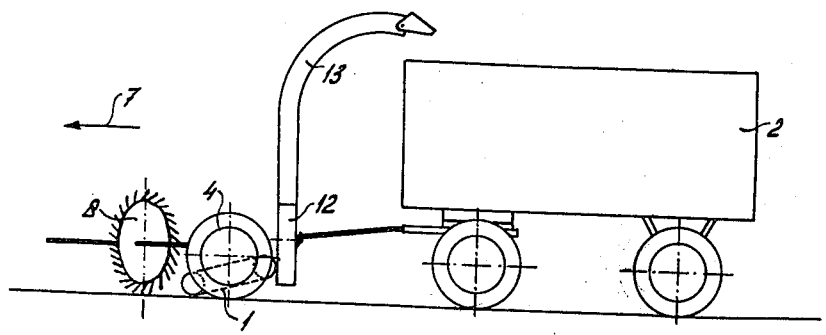
INVENTOR.
CORNELIS VAN DER LELY
BY
Haseltine, Lake + Co.
AGENTS ര
United States Patent Office 2,766,576
Patented Oct. 16, 1956

2,766,576
DEVICE FOR PICKING UP CUT CROP OR OTHER MATERIAL LYING ON THE GROUND

Cornelis van der Lely, Maasland, Netherlands

Application November 26, 1952, Serial No. 322,641

Claims priority, application Netherlands December 3, 1951

4 Claims. (Cl. 56—345)

This invention relates to travelling devices for picking up grass, hay or other material lying on the ground, and more particularly to devices each comprising a vehicular frame with pick-up means for the material and a rake device.

Grass or hay loaders of the above mentioned kind are already known. The rake device of such loaders comprises driven rake members pivotally mounted on a shaft or shafts which, reckoned in the travelling direction, are divergent in the forward direction, while the planes of rotation of the individual rake members, such as pins, brushes or like protruding elements, are convergent in the same direction. These rake members present the drawback that they can only convey a relatively small quantity of material towards the strip of ground defined by the width of the pick-up device and that, especially near the lower part of the device, the accumulated material can escape from the strip of ground over and between the rake members so that especially in a narrow pick-up device there will be a risk that much material will remain uncollected on the ground. Moreover, the driving of these rake members requires much power.

It is an object of the present invention to eliminate these drawbacks and to provide a device which, even when large quantities of accumulated material are concerned, assures that said material is brought within the reach of the pick-up device practically without loss. According to the invention, this is attained in a structure wherein a rake device comprises at least one rotatable rake wheel whose axis, reckoned in the travelling direction, is convergent in forward direction. The rake wheel is put into rotation during movement of the vehicular frame by its contact with the surface of the ground to be worked and gradually forces the material sidewise towards the lower part of the pick-up device.

Rake wheels of this kind provided with circumferential teeth and with substantially vertical wheel planes are known for use in side delivery rakes or swath turners, but in combination with a grass or hay loader or like pick-up device such rake wheels are novel. In this combination, the rake wheels present the particular advantage that the material conveyed laterally can be accumulated to a large height without running the risk that the material might escape over or along the wheels. In contradistinction to driven rake members, which have always a high circumferential speed and will, therefore, exert a rather strong sweeping or striking action upon the material on the ground, the circumferential speed of the rake wheels is considerably lower and substantially equal to the speed of the conveying belt of the pick-up device. Consequently the raking operation will be effected much more gradually and the collected material will be more regularly taken up by the conveying belt. Moreover, the driving of the whole device will require less power.

A further advantage of the rake wheels resides in the fact that these wheels have the property to lift the material from the ground. Near the lower end of the conveying belt of the pick-up device the planes of the adjacent rake wheels will rather closely approach each other and will, therefore, exert a kind of clamping action upon the material lying therebetween, so that the lifting of the material will be furthered. Moreover, since the conveying belt of the pick-up device is inclined in upward direction from its lower end, the adjacent rake wheel or wheels will have an effective working range extending to a much higher level above the ground than when rake wheels of this kind are used in a normal side delivery rake or in a swath turner, where only their lower parts can be effective.

Further objects, features and details of the present invention will appear from the following description with reference to the accompanying drawings, in which some embodiments of the device according to the invention have been illustrated by way of example, and in which:

Fig. 1 is a side elevation of a first embodiment.

Fig. 2 shows the device according to Fig. 1 in plan view,

Fig. 3 illustrates a second embodiment in side elevation and

Fig. 4 is a side elevation of a third embodiment.

In the embodiment shown in Figs. 1 and 2 the device has been carried out as a grass or hay loader, the pick-up device comprising a conveyor 1 of known construction, lifting the material from the ground and delivering same at its upper end onto a vehicle 2. The conveyor 1 is mounted on a frame 3 movable on wheels 4 and 5 and adapted to be coupled with the vehicle 2. At the end of the frame 3 which is remote from the vehicle 2 said frame is provided with a drawing or coupling bracket 6, by means of which the device can be coupled with a tractor (not shown) which is adapted to move the whole device in the direction of the arrow 7.

In front of the lower end of the conveyor 1 and on either side thereof a rake wheel 8 is mounted. Said rake wheels 8 are disposed obliquely with regard to the travelling direction, in such a manner that they are converging equally towards the lower end of the conveyor 1. The rake wheels have their wheel planes in substantially vertical position and are provided along their circumference with teeth 8a or like projections. They are pivotally mounted upon the free extremity of cranks 9 having their other extremity rotatably mounted in oblique beams 3a of the frame 3. The rake wheels 8 have no separate driving mechanism, but the crank shafts 9 are forced by the weight of the rake wheels and in opposition to the action of springs (not shown) to rotate in such a manner that the teeth of the wheels will come into touch with the ground. By moving the vehicular frame 3 in the direction of the arrow 7, the wheels 8 are thus put into rotation so as to laterally displace the material lying on the ground gradually and regularly in the direction towards the lower end of the conveyor 1, where it is lifted from the ground and conveyed in upward direction. The rake wheels 8 will act upon the material over the width of a strip of ground A (see Fig. 2) which is considerably larger than the active width of the conveyor 1. Consequently the conveyor may be carried out with a width which is smaller than or equal to the usual width. If the conveyor is provided with special pick-up members, generally consisting in a known manner of bars or slats, as shown, for example, by J. A. Johnson in Patent No. 947,018 issued January 18, 1910, the latter may be also of normal or smaller width, so that they may be advantageously equipped with resilient teeth. Nevertheless, due to the large width of the strip A and the use of the slowly rotating high rake wheels 8, the device presents a great output and there will be no danger whatever that the collected material escapes along or over the rake wheels. Preferably the rake wheels will be carried out with closed wheel planes, as has been illustrated in Fig. 1.

In the embodiment shown in Fig. 3 the pick-up device is provided behind the loading vehicle 2. Reckoned in the travelling direction 7 the rake wheels 8 are again disposed in front of the lower end of the conveyor 1. Said conveyor 1 has been shown in this embodiment with the collecting bars 10 mentioned already above and said bars may carry resilient teeth or the like along their active edge. The vehicular frame 3 is supported by the wheels 4 located in front of the rake wheels 8 and upon an adjustable rear running wheel 11.

In the embodiment illustrated in Fig. 4 the pick-up device is again located in front of the loading vehicle 2. The rake wheels 8 converge towards the lower end of a short conveyor 1 which picks up the material from the ground and takes same to a working device, such as a cutting or chopping machine 12. From this machine 12 the material is pneumatically delivered through a tube 13 into the vehicle 2.

What I claim is:

1. A ground traversing device for picking up rakable substances and adapted to be driven in ground traversing movement by a source of power comprising an inclined conveyor extending in the direction of travel and having its forward end adjacent the ground, pick up means on said conveyor for picking up the rakable substances, a frame supporting said conveyor in inclined position, wheels on said frame for ground traversing movement, at least one free-wheeling rake wheel in substantially vertical position and provided with tines, a crank for pivotally supporting said rake wheel so that said rake wheel is rotated by circumferential contact with the ground, said conveyor defining a front edge substantially transverse to the direction of travel of said device, and an arm on said frame supporting said crank and thereby said rake wheel with the plane of said rake wheel angularly disposed with respect to said front edge and with the trailing portion of said rake wheel in front of and adjacent the front edge of said conveyor so that rakable substance is transferred directly by said rake wheel to said pick up means and conveyor.

2. A device as claimed in claim 1 comprising a second arm and a second rake wheel supported by said second arm, said rake wheels being supported in divergent planes with respect to the front edge of said conveyor with their trailing portions in front of and adjacent the front edge so that rakable substance is transferred directly between said rake wheels and said conveyor.

3. A device as claimed in claim 2 comprising wheels positioned on said arms further supporting said frame for ground traversing movement.

4. A ground traversing device for picking up rakable substances and adapted to be driven in ground traversing movement by a source of power comprising an inclined conveyor extending in the direction of travel and having its forward end adjacent the ground, pick up means on said conveyor for picking up the rakable substances, a frame supporting said conveyor in inclined position, wheels on said frame for ground traversing movement, at least one free-wheeling rake wheel in substantially vertical position and provided with tines, a support for supporting said rake wheel so that said rake wheel is rotated by circumferential contact with the ground, said conveyor defining a front edge substantially transverse to the direction of travel of said device, and means for attaching to said frame said support and thereby said rake wheel with the plane of said rake wheel angularly disposed with respect to said front edge and with the trailing portion of said rake wheel in front of and adjacent the front edge of said conveyor so that rakable substance is transferred directly by said rake wheel to said pick up means and conveyor.

References Cited in the file of this patent

UNITED STATES PATENTS

| | | |
|---|---|---|
| 1,877,770 | Larson | Sept. 20, 1932 |
| 2,459,961 | Pollard | Jan. 25, 1949 |
| 2,486,766 | Stenzel | Nov. 1, 1949 |
| 2,603,053 | Lipe et al. | July 15, 1952 |